No. 745,825. PATENTED DEC. 1, 1903.
J. D. GUTHRIE.
DRYING REEL.
APPLICATION FILED DEC. 15, 1902.
NO MODEL. 2 SHEETS—SHEET 1.

Witnesses
Edward Reynold Willson
Thomas Fletcher Poynter

Inventor
James Dudley Guthrie.

No. 745,825. PATENTED DEC. 1, 1903.
J. D. GUTHRIE.
DRYING REEL.
APPLICATION FILED DEC. 15, 1902.
NO MODEL. 2 SHEETS—SHEET 2.

WITNESSES
Edward Reynolds Willson
Thomas Fletcher Poynter

INVENTOR
James Dudley Guthrie

No. 745,825. Patented December 1, 1903.

UNITED STATES PATENT OFFICE.

JAMES DUDLEY GUTHRIE, OF SHELBYVILLE, KENTUCKY.

DRYING-REEL.

SPECIFICATION forming part of Letters Patent No. 745,825, dated December 1, 1903.

Application filed December 15, 1902. Serial No. 135,294. (No model.)

*To all whom it may concern:*

Be it known that I, JAMES DUDLEY GUTHRIE, a citizen of the United States, residing at Shelbyville, in the county of Shelby and State of Kentucky, have invented a new and useful Drying-Reel, of which the following is a specification.

My invention relates to improvements in drying-reels; and it consists in the novel construction and combination of parts, as hereinafter described and claimed.

Every fisherman recognizes the importance of thoroughly drying his line after a day's sport in order to prevent it from rotting and soon becoming unserviceable, and also that it is necessary to do so promptly to prevent mildewing.

One object of my invention is the construction of a means for quickly drying a line and which admits of being packed in a small space and of being rapidly and easily assembled ready for use.

A further object is to provide a device for attachment to a fishing-rod which can be quickly wound over with the wet line and which will afford a sufficient spreading and ventilation of the line to insure a speedy drying and from which the line may be readily unwound when dry without any danger of snarling or twisting it.

A further object is to so design the reel that it may be attached to the fishing-rod and the wet line be run off of the regular onto the drying-reel and when dry back onto the regular reel without in any way disturbing the previous arrangements of the attachments on the fishing-rod.

A still further object is the provision of line-drying means so constructed that the same is adjustable for easy attachment to any size fishing-rod.

Further objects and advantages will appear upon reference to the following description and claims when taken in connection with the accompanying drawings, in which—

Figure 2:
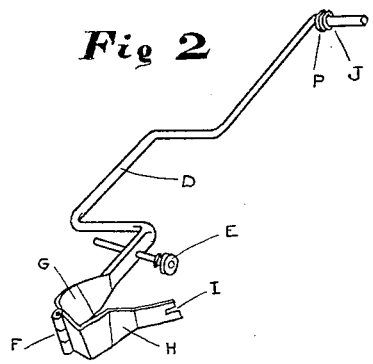
Figure 1:
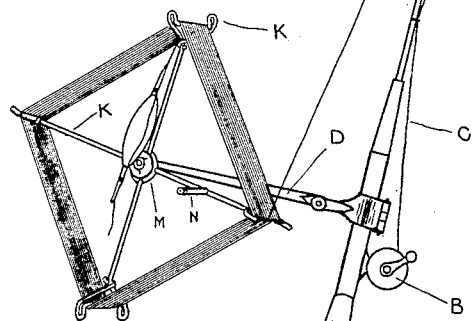
Figure 3:
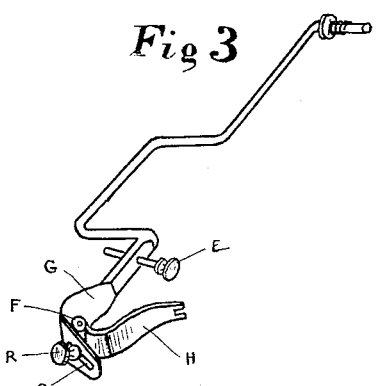
Figure 4:
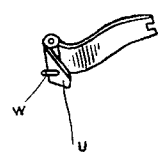
Figure 5:
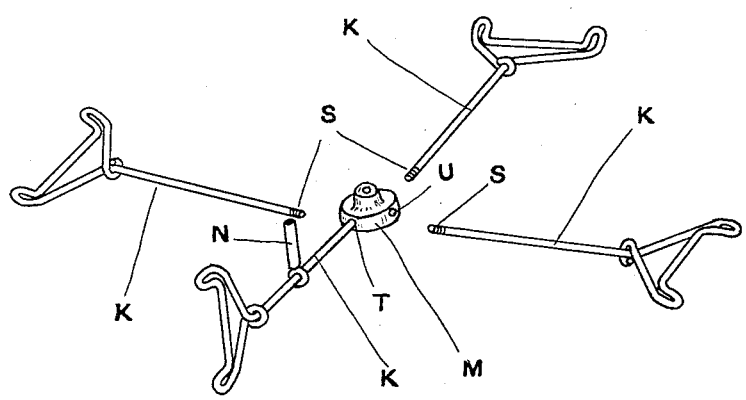
Figure 6:
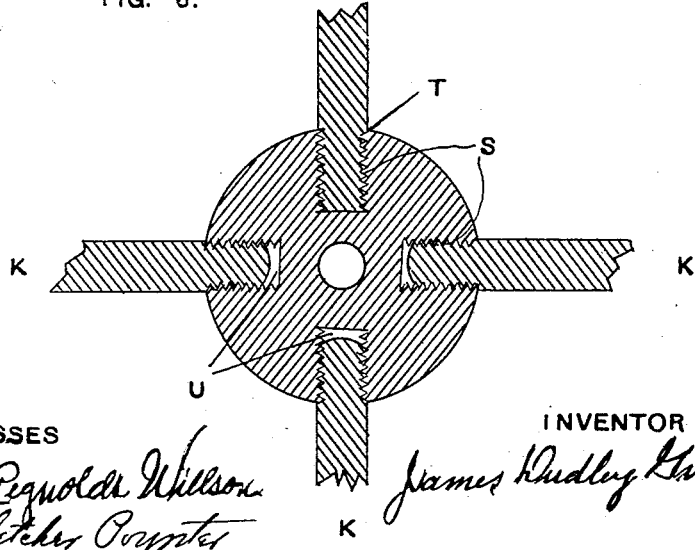

Figure 1 is a view in perspective of an ordinary fishing rod and reel, to which is attached my improved drying-reel, upon which is wound the line to be dried. Fig 2 is a like view, on a larger scale, of the arm D as constructed for easy attachment to the usual sized fishing-rod, so as to pivotally mount the drying-reel thereon. Fig. 3 is a similar view of a supporting-arm having an adjustable clamping means to adapt same for embracing the various sizes of fishing-rods sold. Fig. 4 thows the flap of the adjustable clamp in a separate view. Fig. 5 illustrates in perspecsive the drying-reel with the arms unscrewed and detached from their sockets in the hub. Fig. 6 is a sectional view through the hub, showing the mode of fastening in the spokes.

In all the figures of the drawings similar letters denote similar parts throughout.

A represents the handle of the usual fishing-rod, which carries at B the regular reel. The line C runs from the reel along the rod to the end, as usual. The drying-reel comprises two main parts—the revoluble spool or reel, which carries the line, and the supporting-arm D, which carries at one end a journal J for said reel and at the other end a hinged clamp, which, as shown by Fig. 2, may be made by flattening out the end of D and attaching thereto, by means of a hinge F, the flap H. My preferable mode of constructing the clamped end is that appearing in Figs. 3 and 4, in which the arm D has one end flattened and broadened and bent so as to assume a semicircular loop having an extended end with a slot S. The flap comprises two main parts, one of which, H, has a semicircular body with an extended end having a slot I, the other end being hinged to a flat plate U, having a screw-threaded stud W, proportioned so as to fit the above-described slot. The thumb-screw R, fitting on the stud, operates to fix the flap in any desired position, and thus adapt it to rods of various diameters. From an inspection of the drawings it will be readily understood that the slotted end I is for the purpose of engaging with the thumb-screw E, whereby the clamp may be readily tightened, so as to firmly grip the rod A. The reel consists of the hub M and the forearms or spokes K, which I preferably make by bending predetermined lengths of suitable wire into the T shape shown by the drawings, thus forming light but strong supports for the line. The arm upon which the handle N is mounted is firmly fixed in the socket at T in the hub M by screwing tightly home, by soldering or in any other approved method; but the other three arms are each fitted with screw-threads S, which correspond in pitch to threaded sockets U in hub M, so as to make them readily detachable therefrom, so that the reel may be readily dismantled and packed in a small space. The action of the reel is much improved by providing a small spring P upon the journal J, as shown by Fig. 2. The hub is retained upon the journal by a small nut. (Not shown.) In order that the line will be evenly and directly received upon the drying-reel, it is necessary that it lie in the same plane as the rod, with its circumference approximately tangential thereto, and this end I secure by providing the arm D with the offset or elbow shown by Fig. 2.

The operation of the device is as follows: The supporting-arm D is clamped on the fishing-rod in front of or behind the regular fish-line reel B by means of the flap H and the thumb-screw E, which is easily done, since the screw can be slipped into the slot I. The reel is then prepared by screwing the arms K into the hub M, and this is then placed on the journal of the arm D in front of the friction-spring P and the retaining-nut then adjusted in place. The fish-hook is fastened to one of the arms K and the float and sinker placed as shown by Fig. 1. The reel is then rotated by the handle N, so as to draw the wet line from the other reel and evenly distribute it upon my device. As soon as the line is dry the reel B is operated and the drying-reel emptied and removed and packed up. It will thus be seen that my invention is very convenient and practicable.

The device may be made any size desired; but preferably the supporting-arms should be nine and one-half inches long, the hub one and one-fourth inches diameter, the radial arms five and one-half inches long and three inches wide. Upon following these proportions the whole can be packed in a box eleven and one-half inches long, four inches wide, and one and one-half inches deep, and when set up the device will have a capacity of fifty yards of line, which may be readily wound off or on in half a minute, while the time for putting the whole together will not exceed one minute. It may be made of brass, copper, nickel, aluminium, German silver, or any other desired suitable material.

Having thus described my invention, I claim and desire to secure by Letters Patent—

1. A drying device for fish-lines comprising an elbowed supporting-arm on one end of which is provided a hinged flap having a slotted end which is adapted to be readily interlocked with a thumb-screw mounted upon said end so as to form a clamp for attaching said arm to a fishing-rod, the other end carrying a journal rectangular thereto, and a reel revolubly mounted upon said journal and having a hub carrying a plurality of radial arms for holding the line of which all but one are detachably mounted thereon and said fixed arm carrying a handle for turning the reel and a spring mounted upon said journal and bearing upon said hub to frictionally retard the rotation of the same, substantially as described.

2. The combination of a skeleton knockdown drying-reel and a supporting means for the same comprising an elbowed arm having a journal at one end and provided with an adjustable clamp at the other consisting of two main parts, one of which is the end of the arm formed into a semicircular wide ring having an extended slotted end, and the other is a hinge whose one leaf is shaped correspondingly to the semicircular ring and is notched at the end and whose other leaf is a flat plate with a screw-threaded stud adapted to engage with said slot, a thumb-screw threaded to the arm so as to be capable of attachment to the notched leaf in said notch, and a thumb-screw upon the stud, substantially as described.

3. An adjustable clamp for line-driers comprising a flat semicircular ring having at one end a radial extension with a thumb-screw mounted thereon and having the other end tangentially extended and slotted, and a two-leaved hinge upon one leaf of which is mounted a stud and nut for engagement with the slotted extension and whose other leaf is semicircular in shape and is provided with a notched end for engagement with said thumb-screw, and a reel-supporting journal on said before-mentioned radial extension, as described.

4. A line-drying reel combined with a journaled supporting-arm, elbowed or offset between ends and provided with an adjustable clamping means comprising a curved slotted band, a plate longitudinally adjustable thereto with a threaded stud and nut in the slot for clamping same together, and a curved plate notched at one end and hinged to said adjustable plate, and a thumb-screw joining the curved plates and capable of entering said notch, substantially as described.

In testimony whereof I have signed my name, in the presence of two subscribing witnesses, to this specification.

JAMES DUDLEY GUTHRIE.

Witnesses:
EDWARD REYNOLDS WILLSON,
THOMAS FLETCHER POYNTER.